(No Model.) 7 Sheets—Sheet 1.
E. S. SHIMER.
TYPE WRITING MACHINE.

No. 462,019. Patented Oct. 27, 1891.

Fig. 1

WITNESSES
F. L. Ourand
Wm H. Bates

INVENTOR
Elmer S. Shimer
by A. G. Hupmun
Attorney

(No Model.)

E. S. SHIMER.
TYPE WRITING MACHINE.

No. 462,019.

Patented Oct. 27, 1891.

WITNESSES
F. L. Durand
Wm H. Bates

INVENTOR
Elmer S. Shimer
by A. G. Heymann
Attorney (No Model.)

E. S. SHIMER.
TYPE WRITING MACHINE.

No. 462,019. Patented Oct. 27, 1891.

WITNESSES
F. L. Ourand
Wm. H. Bates

INVENTOR
Elmer S. Shimer
by A. G. Heylmun
Attorney (No Model.)  7 Sheets—Sheet 4.

E. S. SHIMER.
TYPE WRITING MACHINE.

No. 462,019. Patented Oct. 27, 1891.

*Fig. 4.*

WITNESSES
F. L. Ourand
Wm. H. Bates

INVENTOR
Elmer S. Shimer
By A. G. Huylman
Attorney

(No Model.) 7 Sheets—Sheet 6.

E. S. SHIMER.
TYPE WRITING MACHINE.

No. 462,019. Patented Oct. 27, 1891.

WITNESSES
F. L. Durand
Wm H Bates

INVENTOR
Elmer S. Shimer
A. G. Hupman
Attorney (No Model.) 7 Sheets—Sheet 7.

E. S. SHIMER.
TYPE WRITING MACHINE.

No. 462,019. Patented Oct. 27, 1891.

WITNESSES
F. L. Durand
Wm. H. Bates

INVENTOR
Elmer S. Shimer
by A. G. Hoffmann
Attorney

UNITED STATES PATENT OFFICE.

ELMER S. SHIMER, OF MILTON, PENNSYLVANIA.

TYPE-WRITING MACHINE.

SPECIFICATION forming part of Letters Patent No. 462,019, dated October 27, 1891.

Application filed February 5, 1891. Serial No. 380,282. (No model.)

*To all whom it may concern:*

Be it known that I, ELMER S. SHIMER, a citizen of the United States of America, residing at Milton, in the county of Northumberland and State of Pennsylvania, have invented a new and useful Type-Writing Machine, of which the following is a specification.

My invention has relation to type-writing machines wherein a plurality of type-bars arranged in a circular support to strike at a common central point are actuated by key-levers; and the object is to simplify the mechanism and reduce the number of key-levers. With these objects in view I have devised and constructed the type-writing machine illustrated in the accompanying drawings, wherein—

A designates the base of the machine, of such height as to properly take the several levers used to actuate the adjustable type-bar ring and the key-levers, and such other elements as may be requisite. On this base are supported the standards 1 2 opposite to each other, and to the tops of which is secured the ring 3, constituting a pawl-ring and carriage-support. The ring 3 is of metal, and has formed in its under side radially-arranged seats 4, in which are fitted and secured supporting-pieces 5, having their inner ends projecting beyond the inner face of the ring, as shown, to serve as supports to the type-bar ring or basket. The inner upper portion of the ring is cut back, as at 6, to provide room for the movement of the heel portions of the type-bars, and in the ring are a number of vertical holes 7, in which the pawls are arranged and by which they are guided in their movements. In the ring 3 at radially-opposite points the upper face is hollowed out, as at 8, that the roller-platen may be journaled to rest at a lower point, and thus shorten the space between the point of rest at which the type stands and the point of contact with the platen. This arrangement shortens the stroke and consequently increases the printing capacity of the machine. The frame of the basket 9 is fastened to the ring 3, substantially as shown by dotted lines in the drawings, the ends of the frame projecting into openings in the ring.

Figures 3, 13:
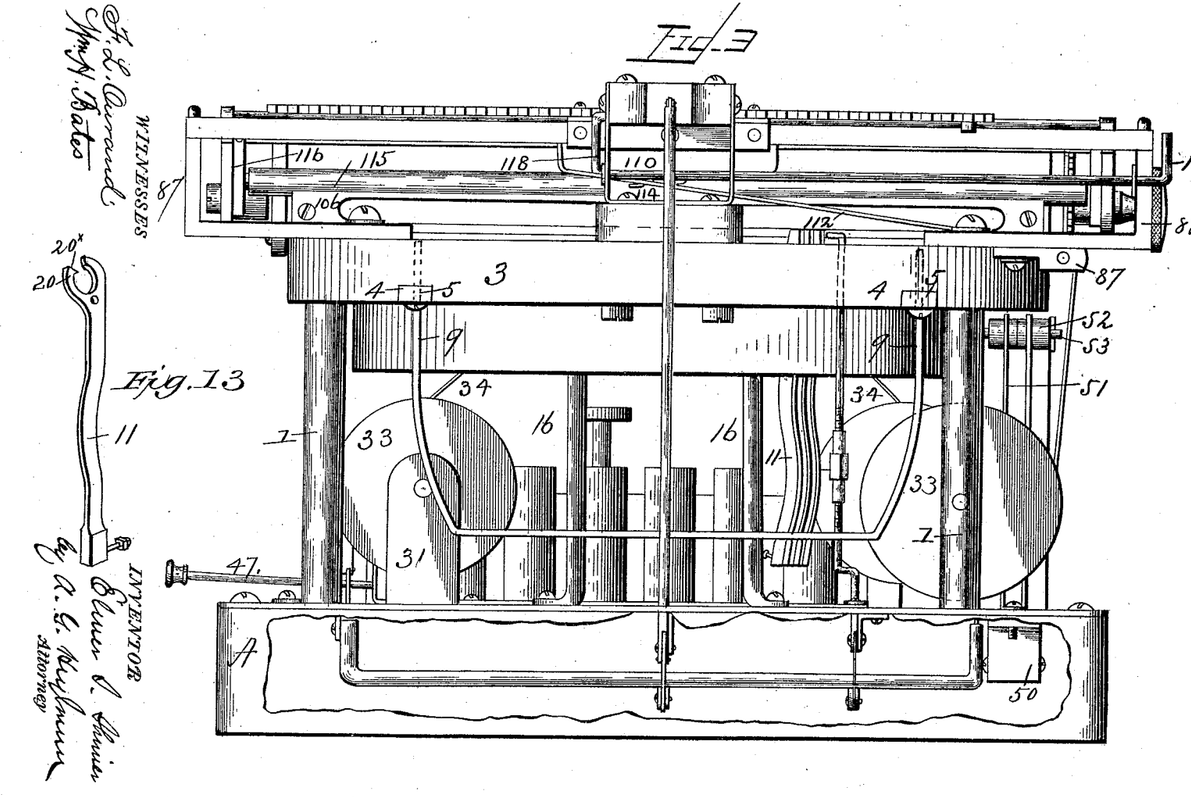
Fig. 3 is a rear end view of the machine.
Fig. 13 is a detail of one of the type-bars.
Figure 4:
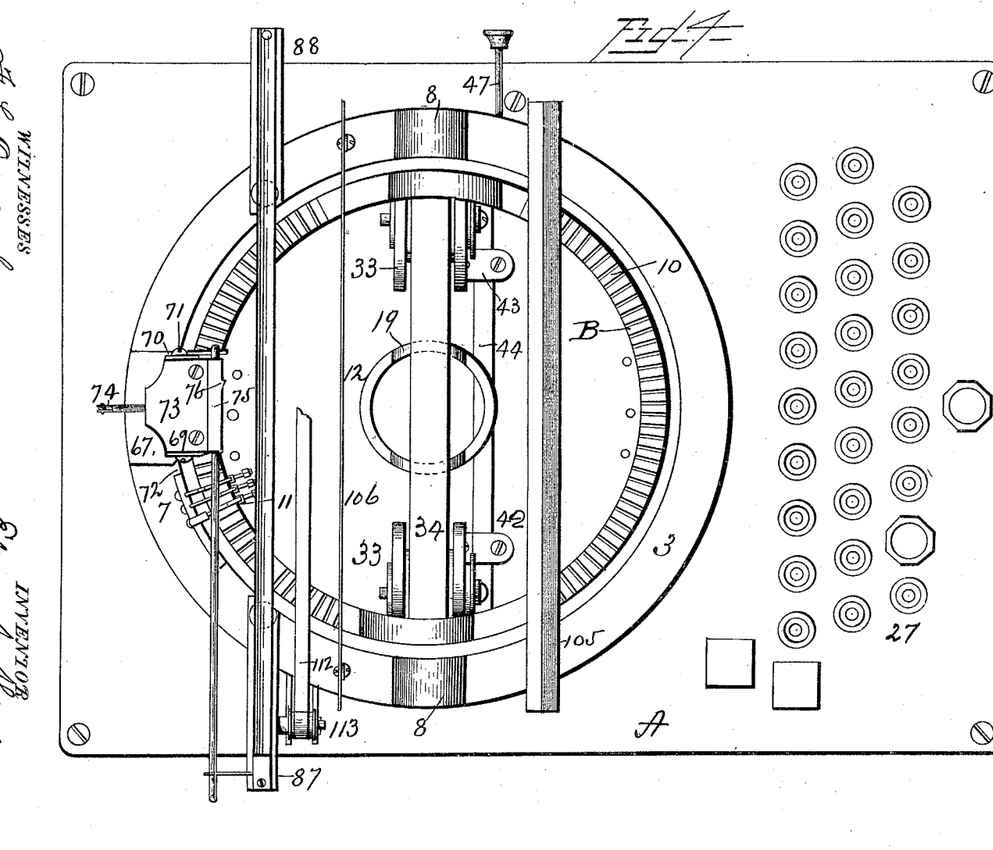
Fig. 4 is a plan view of the machine, with the carriage removed.
Figure 6:
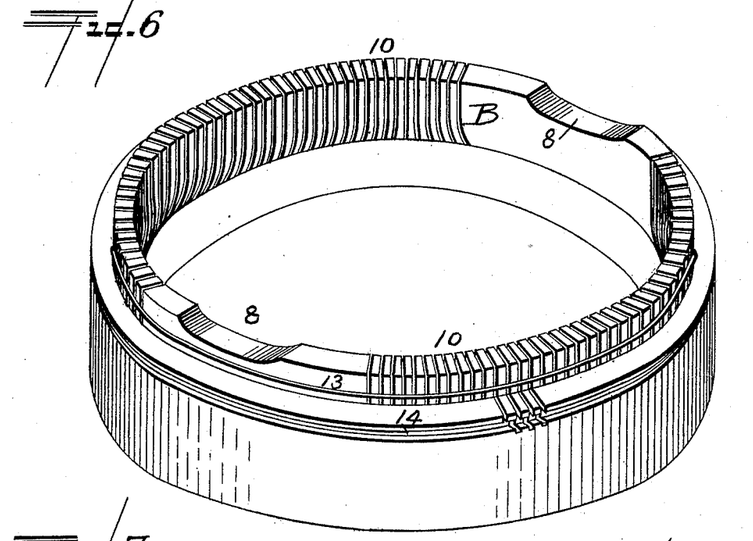
Fig. 6 is a detail of the type-bar ring or basket.

B designates the type-bar ring or support for the type-bars, having its inner upper part formed with a requisite number of vertically-arranged and radially-directed grooves 10, within which the pivotal ends of the type-bars 11 are pivotally supported on a wire 12, passed through holes in the heels of the type-bars and lodged in an annular groove 13, the wire thus forming the common pivotal support of all the type-bars. The type-bar support or ring is provided with an annular groove 14, in which the ends of the supporting-pieces 5 engage and support the ring in position. The type-bar ring has a limited shifting movement through the instrumentality of the shifting-levers, as will be hereinafter more fully specified.

Figure 7:
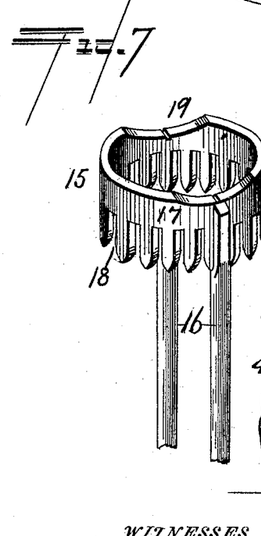
Fig. 7 is a detail of the type-bar guide and aligner.
Figure 8:
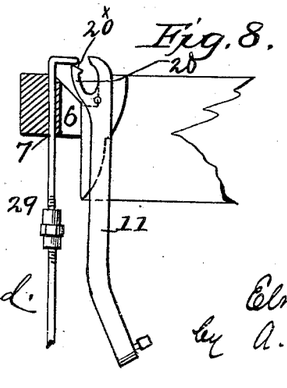
Fig. 8 is a detail of the portion of the pawl-ring with the pawl in position.

The type-bars, as indicated, strike at a common central point on the platen, and in order that each and every one of them may strike with certainty, accuracy, and uniformity in alignment, a type-bar guide and aligner 15 is provided. This consists of suitable supports 16, mounted in the center of the machine-frame, the supports having a short cylinder-ring 17 on their tops. This cylinder has cut in it from its under edge tapering slots 18, in which the type-bars are thrown, and the upper ends of the slots being directly on a line with the point of contact of the type with the platen and the fulcrum or point of the bar the type is forced to align at each stroke. The upper part of the cylinder 17 is cut away, as shown at 19, to serve as a ribbon-guide.

The type-bars 11 are formed with a rear heel portion 20, terminating in a curved or cam surface end 20×, which rests under the nose of the pawl, as shown in the drawings. This formation brings the pawl to always bear on the outer heel portion, and the leverage is maintained at longest distance from the type-bar pivot during the whole of the pull, relieving friction between the parts and making the action smooth, regular, lighter, and easier. From the inner end of the heel of the type-bar is projected a lug $a$, having its end turned down, as at $b$, so that the recess between the projections is enlarged to not interfere with the movements of the pawls, while the turned-down end impinges on the top of the pawl and tends to return the bar by the rebound.

Figure 5:
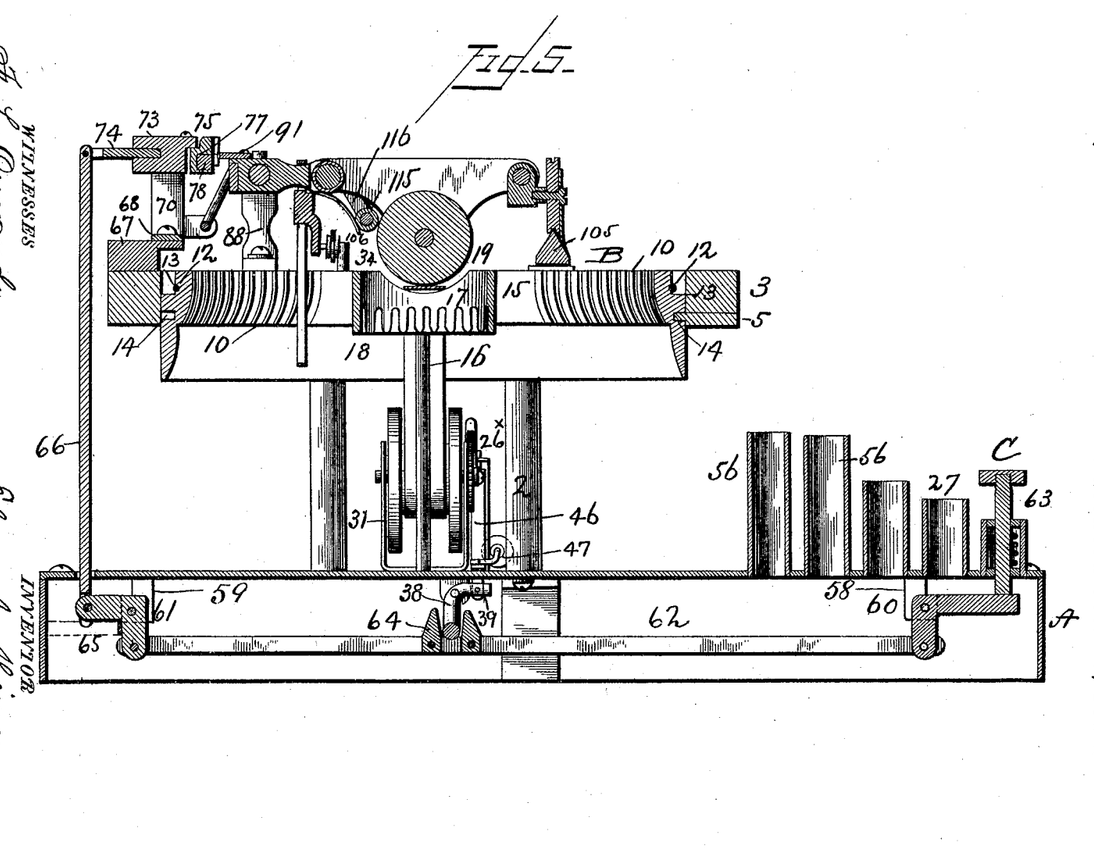
Fig. 5 is a longitudinal sectional view.

To operate the type-bars the following mechanism or means is provided: To the under side of the base-piece of the machine are fastened two bearing studs or brackets 21 22 at near the respective ends, or in such other positions as the lengths of the levers or bars may require. To these bearing-studs are fulcrumed bell-crank levers 23 24, having their lower arms connected by a bar 25, substantially as shown. To the upper or horizontal arm of the bell-crank lever 23 is connected the lever end of the push-pin or finger-piece 26, which is arranged in a tube 27, in which is confined a spring 28, which returns the finger-piece to its upper limit after being depressed. To the upper arm of the bell-crank lever 24 is connected the lower end of the stem of the pawl 29, which consists of a straight rod having its nose or pawl-piece struck at right angles to its stem and arranged to rest normally over a heel of a type-bar carrying a "lower-case" type. It will now be perceived that by pressing the finger-piece down the bell-crank levers actuate the pawl and bring its nose or pawl-piece in contact with the heel of the type-bar, thus throwing the type-bar up and causing it to strike the ribbon. On the bar 25 is a lug 30, which sets against the bail, bar, or lever, which actuates the ribbon mechanism.

Figure 11:
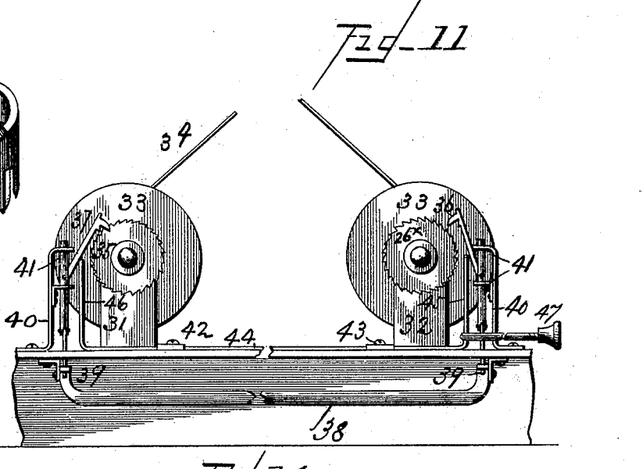
Fig. 11 is a detail of the ribbon reversing and carrying mechanism.

The ribbon mechanism will now be described. On the base or floor of the machine are mounted standards 31 32, oppositely arranged on the line with the platen-roller, and in these standards are journaled the ribbon-sheaves 33, having the ribbon 34, arranged as usual. On the journal of each ribbon-sheave is a ratchet-wheel 35 26×, which is engaged by the pawls 36 37 to pull one way or the other, as may be desired. Under the base of the machine is hung a bail or lever 38, as shown, having its ends extended beyond its pivots or fulcrums, as at 39, and connected to the stems of the pawls 36 37. The supports of these pawls consist of standards 40, fixed on the base A, and provided with guide-rings or staples 41, the pawls being joined to the stems, so as to fall in engagement with the ratchets of the ribbon-sheaves.

*To shift or reverse the movement of the ribbon.*—On the base are secured keepers 42 43, under which is arranged a sliding bar 44, having its ends 45 46 struck vertically and arranged to engage the respective pawls, as shown. At one end of the bar 44 is a finger-piece 47 by which the bar is shifted. Now, by moving the bar in either direction one of the vertical ends are brought in position to lift a pawl from engagement with the ratchet and leaves the other in engagement with the other ratchet, so that when the bail or lever 38 is pushed by the movement of the key-lever through engagement with the lug 30 the pawl is operated and the ribbon carried forward in such direction. The type-levers are returned to their normal position by the springs in the tubes of the finger-pieces and the bail is returned to its normal position by the return movement of the spacing-lever, as will be hereinafter specified.

Figure 1:
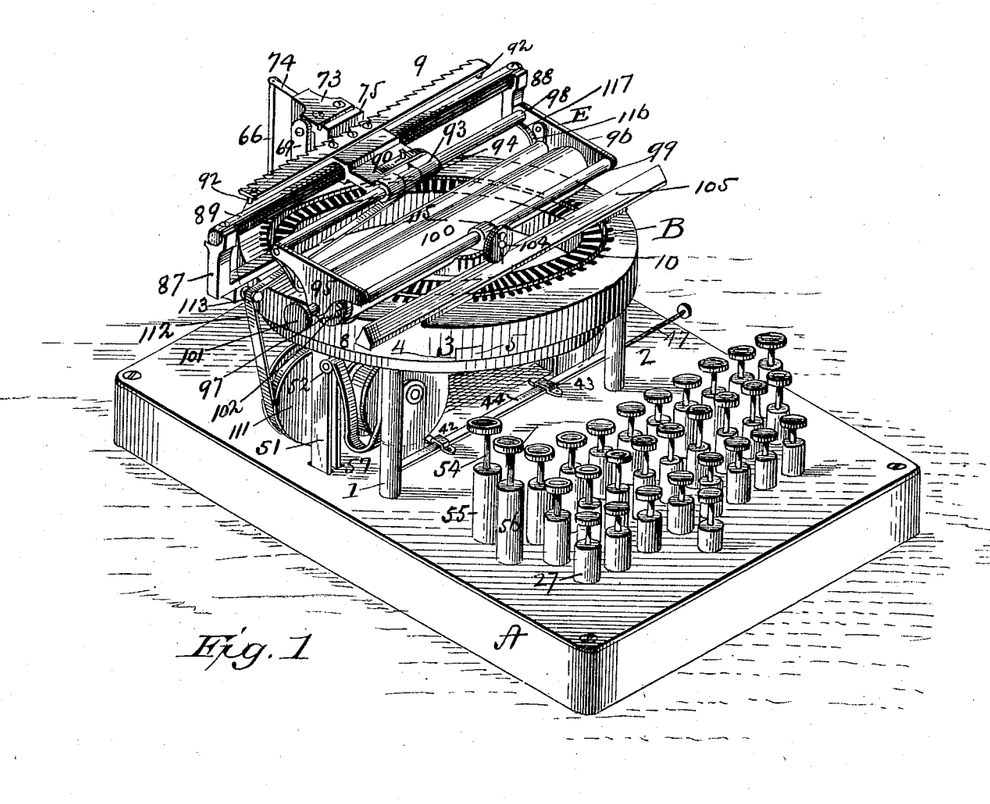
Figure 1 is a perspective of the machine, the guide-bar and its sheave being omitted to more clearly show the other parts.
Figure 2:
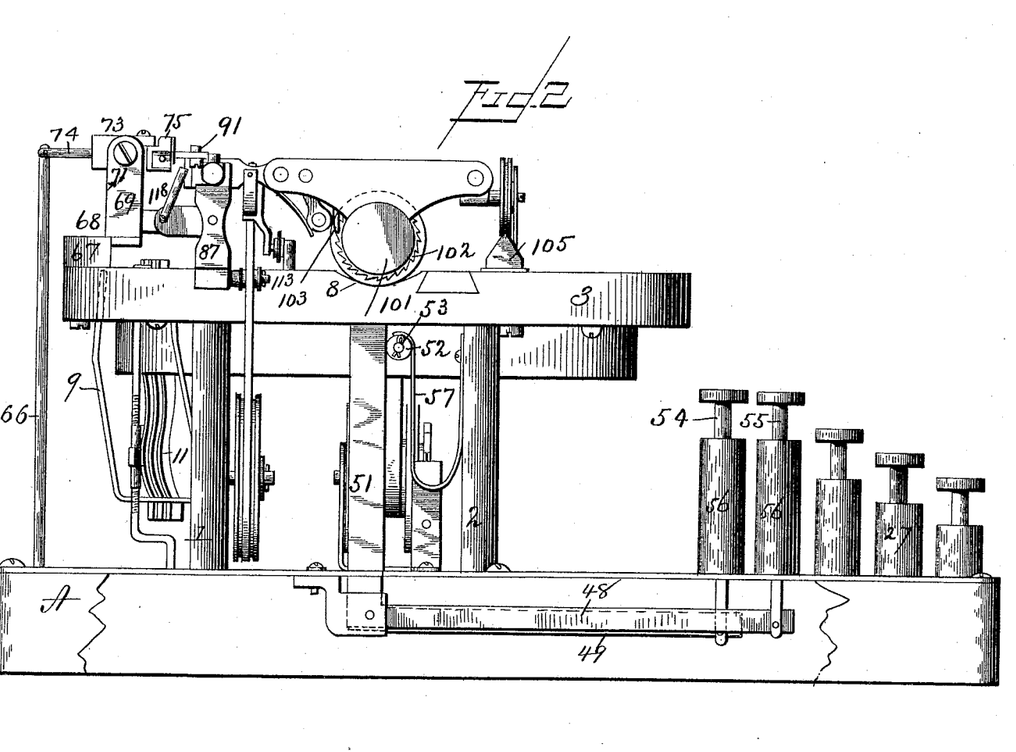
Fig. 2 is a side view of the same, showing actuating-spring of the shifting mechanism.

The connected levers and bar constituting the key-lever are the means for striking normally the lower-case characters, and for this purpose the pawl actuated by the key-lever is arranged to stand with its angularly-bent nose or projection directly in position to engage the heel of a type-bar designated by the lower-case character on the finger-piece; but, as mentioned, it is the purpose of my invention to shift the type-bar ring so that a single pawl and lever will engage two or three type-bars, and thus be brought into requisition to imprint in succession or at will the different characters indicated on the plate of the finger-piece. To accomplish this levers 48 49 are fulcrumed in a bracket 50, secured to the base. These levers consist of a metal bar bent at right angles and having their vertical arms 51 projected up through the floor of the base, as shown, and engaging with their upper ends anti-friction roller or rollers 52, mounted on a pivot-piece 53, fixed on the shiftable type-bar ring. The outer ends of these levers are secured to the stems of finger-pieces 54 55, disposed in tubes 56, in which may be arranged the springs to lift the levers and bring them to their normal position. This return movement is also insured by means of the spring 57, one end of which is secured to the post of the machine and the other end arranged to bear on the roller 52, substantially as shown in the drawings. By depressing the finger-piece intended for shifting the type-bar ring from its normal position to bring a type-bar bearing a capital, the ring is drawn around, and the finger-piece of the character being depressed the proper type is imprinted on the paper, and by depressing the other shifting-lever the type-ring is drawn to present a type-bar nearing another character and that struck by the same key-lever, so that one key-lever in turn operates three type-bars.

Figure 12:
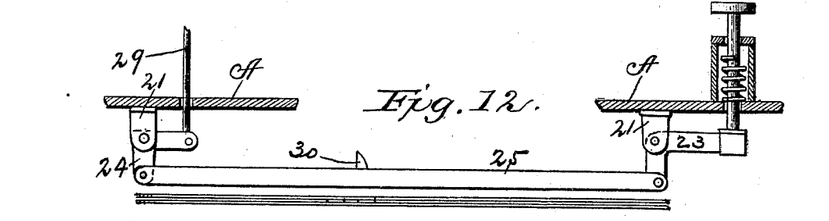
Fig. 12 is a detail of the spacing-lever.
Figure 14:
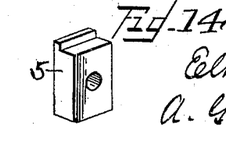
Fig. 14 is a detail of one of the supporting-pieces.

C designates the spacing-lever, constructed as follows: To the base of the machine are secured two bearing-pieces in studs 58 59, to each of which is fulcrumed a bell-crank lever 60 61, having their lower arms pivotally connected by a connecting rod or bar 62. The upper arm of the bell-crank lever 60 is free and unconnected from the spring-actuated finger-piece 63, the end of the lever lodging or resting against the lower end of the finger-piece, as shown. On the bar 62 is formed a seat 64, in which the bail of the ribbon mechanism is disposed, and on the end of the lower arm of the bell-crank lever 61 the free end of a spring 65 bears to force the spacing-lever back to normal position, so that when either the spacing-lever or the key-lever moves the bail of the ribbon mechanism forward it is returned by the force of the spring 65, and the same means also returns the levers to their normal positions. To the rear arm of the bell-crank lever 61 is attached one end of a rod 66, having on its other end the rocking bracket of the spacing-dogs.

Figure 10:
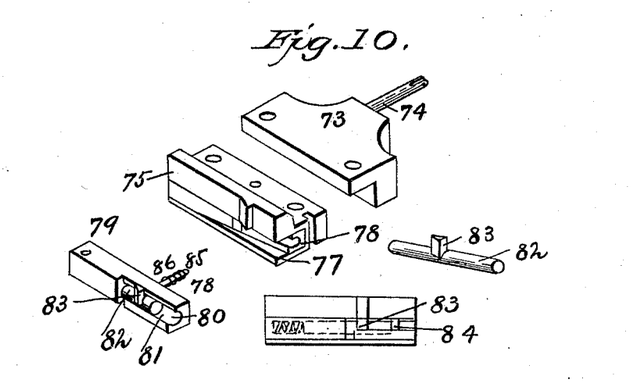
Fig. 10 is a detail of the spacing-pawls and bracket.

The mechanism constituting the spacing-dogs and their associate parts I will now describe. On the pawl-ring directly at the rear is mounted a base-piece 67, on which is a piece of metal 68, having its ends struck vertical, forming bearing arms or standards 69 70, in which are bearings to take bearing screws or pins 71 72, on which a rocking bracket 73 is mounted. A rearwardly-projecting arm 74 on this bracket is connected at its end to the upper end of the rod 66, so that by operating the spacing-lever this bracket is rocked and the dogs brought in succession to hold the carriage during the operation of writing and to give the proper intermitting movement thereto. The rocking bracket has an overhanging part, to which the frame or housing 75 of the spacing-dogs is secured by screws, as shown. This housing consists of a piece of metal having on its inner face a stop, lug, or dog 76, serving as the stop which holds the carriage while the types are struck. In the lower part of this housing is a channel 77, in which is a piece 78, pivoted or fulcrumed at the end 79, and has a central bore 80, extending well through it, with a portion of the shell cut away in the front, as at 81. In this bore is the spring-dog 82, having a lug or catch 83 on the part exposed to engage the rack on the carriage. In the bore of the piece 78, at the bottom, is placed a spring (not shown) which serves to push the dog out when moved longitudinally by the rack, and to keep the piece in its place and from being thrown clear out a stop-pin 84 is set across the bore at the proper position. On the back of the dog-piece is a pin 85, on which is a spring 86, which forces the dog outward and into engagement with the rack on the carriage. On brackets 87 88, secured to the pawl-ring and having metal posts or standards, is secured the carriage-bar 89, consisting of a round bar. On this bar is a sleeve 90, arranged to slide thereon, and on the top of the sleeve is a rack-bar 91, the rack of which is engaged by the dogs of the spacing-bracket, and which by the vertical successive motions of the dogs permits the carriage to advance. The rack has at each end a lug 92, which slides along the bar and keeps the rack in alignment therewith. The sleeve 90 has the front side extended and formed with a sleeve 93, in which is pivotally held the rear bar of the carriage, the bar being held against longitudinal displacement on the sleeve by a washer 94 on the bar in an opening in the middle of the sleeve and secured by a set-pin.

Figure 9:
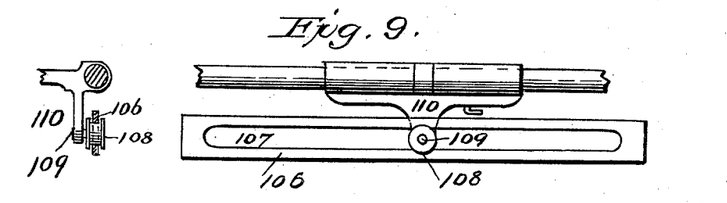
Fig. 9 is a detail of the under guide-rail of the carriage and holding and guide roller.

E designates the carriage, the frame of which consists of end pieces 95 96, having their middle portions extended downward, as at 97, and bearing-holes made in the extensions to receive the roller-platen. The end pieces are connected by bars 98 99, the former of which is secured at its middle in the sleeve of 93, so that the carriage may be lifted, swung, or turned up and back on the carriage-bar at the rear. On this frame is journaled the roller-platen 100, having the journal at one end extended, and a finger-piece 101 on the end, by which the platen is turned. On the end of the platen is a ratchet 102, engaged by a pawl 103, which regulates the lining of the page. On the front bar of the carriage in the middle is a sheave 104, journaled in a bracket and having the usual pointer or index, the sheave traveling on a guide-bar 105, mounted across the machine and provided with graduations marking the space-positions of the platen. Across the machine in alignment with the line of direction of the carriage and secured to the pawl-ring is a guide-bar 106, formed with a race 107, in which a sheave 108 travels and holds the carriage-frame at the rear from tipping or being thrown upon the bar carrying the rear sleeve of the carriage-bracket. The sheave 108 is journaled on a pin 109, projected from a bracket 110, secured under the bridge-piece or body part of the carriage-bracket. On a bearing projected from the rear side of the machine is journaled the band-pulley 111, provided with an interior actuating-spring, as usual, to draw the carriage. One end of the band 112 is fastened to this pulley and the band then carried over an anti-friction pulley 113 on the bracket 87 and thence taken to the bracket 110 and anchored to a hook 114 and the end carried up and fastened to a pin on the carriage-bracket. The feed-roll 115 is journaled in swinging arms 116 at the rear of the roller-platen and caused to continually bear in the direction of the platen by springs 117, arranged to exert force on the swinging arms. To run the carriage forward with a movement more extended than its successive intermittent progress, I mount a lever 118 in bearings at the rear of the machine, substantially as shown, and engage one end of the lever with the spring-dog, so that by rocking the lever backward the dog will be withdrawn from engagement with the rack and the carriage moved forward or as desired.

The operation of the several elements has been briefly stated in specifying their construction and the operation of the machine may be readily perceived from such descriptions; but in order that the whole operation may be fully ascertained and understood I here rehearse the same. As is usual in machines of this character, the key-levers stand in position to strike a lower-case type, and to attain this in my machine the proper finger-piece is depressed, which action brings the pawl in engagement with the type-bar and impels it straight against the platen. The movement of the key moves the connecting-bar of the lever against the bail of the ribbon mechanism and at the same time the bail carries forward the spacing-lever, which rocks the bracket carrying the dogs and shifts the carriage, causing the return of the levers by the spring at the end of the frame, which movement restores the mechanism for the next action. If a capital or other character is desired, the proper shifting-lever is depressed, which pulls the type-bar ring accordingly, and the proper key being struck the right character will be imprinted. The carriage may be returned after reaching the limit of its travel by simply pushing it back and the lining effected by turning the platen-roller to the proper distance in revolution.

The present invention is designed as an improvement in the mechanism shown by my pending application, Serial No. 364,249, wherein the ring carrying the pawls is made shifting, and the pawls contained therein shift with the outer ring, the construction and operation of the pawls being substantially as herein shown and described.

Having thus given a written description of my invention, and of the manner of making, constructing, and using the same, and having also explained the principle thereof and the best way in which the application is contemplated, so as to distinguish the machine from other inventions, I now proceed to particularly point out and distinctly claim the parts, improvements, and combinations.

I claim as my invention as follows:

1. The type-bar guide and aligner and ribbon-guide, consisting of a short cylinder mounted centrally in the machine and having a number of slots in its lower edge to take and guide the type-bars and having its upper sides cut away to receive and guide a ribbon, substantially as described.

2. In a type-writing machine, the combination of the type-bar ring formed with an annular groove, the outer supporting-ring having flange-pieces to engage the groove of the type-bar ring, and levers to shift the type-bar ring, substantially as described.

3. In a type-writing machine, the combination of a type-bar ring formed with an exterior annular groove, an exterior supporting-ring having radial ways formed therein, supporting-pieces fixed in the ways, having their inner ends formed to project in the groove of the type-bar ring, and levers, as 48 and 49, to shift the type-bar ring, substantially as described.

4. In a type-writing machine, the combination of a type-bar ring formed with an exterior annular groove, an exterior supporting-ring having radial ways formed therein, supporting-pieces secured in the ways, having their inner ends projected in the groove of the type-bar ring, an anti-friction roller on the side of the type-bar ring, levers, as 48 49, arranged to bear with their ends on the anti-friction roller to shift the type-bar ring, and a spring, as 57, to return the type-bar ring to normal position, substantially as described.

5. In a type-writing machine, the combination of a pawl-ring, type-bars pivotally mounted in the type-bar ring, vertically-reciprocating pawls in the pawl-ring, levers to reciprocate the pawls, and levers to shift the type-bar ring, whereby one pawl may engage more than one type-bar, substantially as described.

6. In a type-writing machine, the combination of the key-lever formed with a vertical lug, a bail hung under the machine-bed to engage said lug, and the spring-actuated spacing-lever having a seat to take and hold the bail, whereby when the key-lever is operated the spacing mechanism is actuated and the lever returned to its normal position, substantially as described.

7. In a type-writing machine, the combination, with the spacing mechanism, of the spacing-lever composed of two bell-crank levers fulcrumed at opposite ends of the machine and a connecting-rod between the vertical arms of the bell-crank levers, a finger-piece to depress the free arm of the forward bell-crank lever, and a spring bearing against one arm of the rear bell-crank lever to return the lever to its normal position, substantially as described.

8. In a type-writing machine, the combination, with the rack-bar of the carriage and an actuating-lever, of the rocking space-bracket formed on its inner face with a fixed dog or lug to engage the rack on the carriage and formed with a channel 77 in its lower face, a piece 78, fulcrumed in the channel and formed with a central bore, a spring-dog 82, having longitudinal play in the bore, and a spring behind the piece 78 to press it outward, substantially as and for the purpose specified.

9. In a type-writing machine, the combination, with the spacing-bracket and its housing 75, formed with a channel, of the piece 78, fulcrumed therein, and the rocking lever 118, secured at one end to the spring-dog, whereby said dog may be disengaged from the rack, substantially as and for the purpose specified.

10. In a type-writing machine, the combination, with the carriage-supporting bar and the carriage-sleeve mounted therein, of the sheave 108 and the guide-bar 106, formed with a race 107, substantially as described.

In witness whereof I have hereto set my hand in the presence of two attesting witnesses.

ELMER S. SHIMER.

Witnesses:
   JOS. ANGSTADT,
   H. E. ANGSTADT.